United States Patent
Hurst et al.

(10) Patent No.: US 6,427,166 B1
(45) Date of Patent: *Jul. 30, 2002

(54) METHOD AND APPARATUS FOR ROUTING AND CONGESTION CONTROL IN MULTICAST NETWORKS

(75) Inventors: Stephen A. Hurst, Nashua, NH (US); Joseph Wesley, Quincy, MA (US); Stephen R. Hanna, Bedford, MA (US); Miriam C. Kadansky, Westford, MA (US); Philip M. Rosenzweig, Acton, MA (US)

(73) Assignee: Sun Microsystems, Incorporated, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/668,432
(22) Filed: Sep. 22, 2000

Related U.S. Application Data (63) Continuation of application No. 09/063,637, filed on Apr. 20, 1998, now Pat. No. 6,151,633.
(51) Int. Cl.[7] ............................................. G06F 13/00
(52) U.S. Cl. ..................... 709/220; 709/224; 709/235; 709/238; 370/254
(58) Field of Search ............................. 709/201, 220, 709/221, 222, 223, 224, 230, 238, 243, 244, 250, 235; 370/229, 232, 235, 236, 254

(56) References Cited

U.S. PATENT DOCUMENTS

| | | | |
|---|---|---|---|
| 5,289,460 A | 2/1994 | Drake, Jr. et al. | 370/17 |
| 5,313,454 A | 5/1994 | Bustini et al. | 370/13 |
| 5,331,637 A | 7/1994 | Francis et al. | 370/54 |
| 5,361,256 A | 11/1994 | Doeringer et al. | 370/60 |
| 5,675,576 A | 10/1997 | Kalampoukas et al. | 370/232 |
| 5,831,975 A | 11/1998 | Chen et al. | 370/256 |
| 5,903,559 A | 5/1999 | Acharya et al. | 370/355 |
| 5,905,871 A | 5/1999 | Buskens et al. | 395/200.75 |
| 6,078,590 A | * 6/2000 | Farinacci et al. | 370/432 |
| 6,185,210 B1 | * 2/2001 | Troxel | 370/395 |

OTHER PUBLICATIONS

D. Katz, RFC 2113 entitled "IP Router Alert Option", published Feb. 1997.

Douglas E. Comer, Chapter 17, entitled "Multicast Addressing (IGMP)" in Book entitled "Internetworking with TCP/IP vol. 1 Principles, Protocols, and Architecture", 2sup.nd Edition, published by Prentice Hall, 1991, pp. 281–290.

D. DeLucia and K. Obraczka, "Multicast Feedback Suppression Using Representatives", Infocom 1997, 16.sup.th Annual Joint Conference of the IEEE Apr. 7–12, 1997, pp. 463–470.

* cited by examiner

Primary Examiner—Viet D. Vu
(74) Attorney, Agent, or Firm—Squire, Sanders & Dempsey LLP (57) ABSTRACT

An embodiment consistent with the present invention includes a method and apparatus for distributing multicast data. The method may be performed by a data processor and comprises the steps of forming a multicast repair tree including a sender, a plurality of heads, and a plurality of receivers, wherein at least one head is associated with the sender and at least one receiver is associated with the head; sending, by a sender to the plurality of heads and the plurality of receivers, a plurality of multicast messages at a data rate; receiving, by the sender from one of the plurality of heads, a congestion status associated with a receiver of the head; and slowing the data rate, by the sender, in accordance with the congestion status.

16 Claims, 10 Drawing Sheets

Multicast Data Distribution Set-up

FIG. 1
Multicast Data Distribution Set-up

FIG. 2
Example of Multicast Message Packet Format

FIG. 3
Distributing Multicast Data

FIG. 5 PRUNING OPERATION AT A HEAD

FIG. 6 MONITOR AND ISOLATE PRUNING CANDIDATES

FIG. 7 PRUNE RECEIVERS

FIG. 8

FIG. 9 SENDER

METHOD AND APPARATUS FOR ROUTING AND CONGESTION CONTROL IN MULTICAST NETWORKS

CROSS-RELATED APPLICATIONS

This application claims priority to and incorporates by reference parent application U.S. patent application Ser. No. 09/063,637, entitled "Method and Apparatus for Routing And Congestion Control In Multicast Networks" by inventors Stephen A. Hurst, Joseph Wesley, Stephen R. Hanna, Miriam C. Kadansky and Philip M. Rosenzweig filed on Apr. 20, 1998 U.S. Pat. No. 6,151,633.

FIELD OF THE INVENTION

The present invention relates generally to network communications. More specifically, the invention is a method and apparatus for performing sender-initiated pruning of slow receivers in a multicast data distribution set-up.

BACKGROUND OF THE INVENTION

In a multicast data distribution set-up a sender ("a source"), sends multicast data messages to a plurality of receivers called a multicast group. The sender's data rate is preconfigured or dynamically determined. Receivers in the multicast group provide the sender with data reception feedback in the form of repair requests. The sender responds to the data reception feedback by retransmitting the data to the multicast group.

The sender can operate in a mode that is either sensitive or insensitive to the data reception feedback, depending upon what the design goal is. A sender that is sensitive to data reception feedback responds to all or nearly all of the repair requests sent by receivers. A sensitive sender provides very reliable data transmission but it can be slow where there are a large number of receivers. When numerous receivers send repair requests, the sender uses a higher percentage of its available resources for servicing repair requests and has less resources available for performing other tasks such as sending more data. The result is a drop in the sender's performance.

Operating in an insensitive mode enables the sender to operate more quickly, but has some drawbacks. An insensitive sender ignores some repair requests, resulting in the sender being able to perform faster but also reducing the reliability of the data transmission if there are a large number of receivers. However, there are drawbacks such as not being responsive to network congestion, not being network friendly and being unable to deliver data to as many receivers as possible.

One way to overcome these problems is to implement pruning techniques. Pruning techniques involve identifying receivers which reduce the overall performance of the sender and removing them from the network so that the sender will perform faster. Currently available pruning techniques rely on either the sender or the receiver to perform the pruning. Both techniques prune unresponsive receivers from the data distribution set-up. As receivers are pruned from the data distribution set-up, the sender is left with fewer receivers from which it can expect to receive repair requests. Sender-initiated pruning techniques are entirely under the sender's control and remove receivers that are too slow, for example, receivers that operate at a much lower data rate than the sender. Receiver-initiated pruning techniques operate by having the receivers voluntarily prune themselves if they can not keep up with the sender's data rate. One problem with sender-initiated pruning techniques is that they tend to become less reliable as the number of receivers in the multicast group grows, because the sender becomes overloaded from servicing the large number of group members.

Receiver-initiated pruning techniques operate from the receiver as opposed to from the sender. Each receiver tracks whether or not it is able to respond to the data rate of the sender. The lightweight reliable multicast protocol (LRMP) uses this technique. In the receiver initiated pruning model, when a receiver detects that it is unable to keep up with the sender's data rate, it voluntarily prunes itself from the multicast data distribution tree. One problem with the receiver initiated pruning is that receivers may prune themselves prematurely in a situation where the sender may have been able to accommodate them by reducing its data rate.

SUMMARY OF THE INVENTION

To overcome the disadvantages of existing pruning techniques, and consistent with the present invention, the multicast delivery system support a centralized mechanism for initiating the pruning process in which receivers which do not meet minimum reception criteria can be isolated and removed from the multicast data distribution set-up without allowing the receivers to prune themselves independently and prematurely.

The sender provides a signaling mechanism to a tree-based hierarchically organized multicast data distribution set-up having multiple repair groups. The tree-based multicast data distribution set-up includes a sender at the root and a plurality of receivers extending from the sender like branches on the tree. The branches are organized into groups called repair groups. Some of the receivers function as the heads of these repair groups. The heads are responsible for servicing repair requests from members of their groups so that the sender is not obligated to service repair requests from all of the receivers in the data distribution set-up.

To determine which receivers should be pruned the sender uses a centralized signaling mechanism that responds to network congestion feedback information from one or more of the receivers. Based on the congestion feedback, the sender recommends that the group heads select candidates for pruning from their groups. Receivers become candidates for pruning if they are slow, not responsive, or request an excessive number of repairs from the group head. A receiver is considered to be slow if it runs at a data rate much lower than the sender's data rate. The sender can reduce its data rate to accommodate slow receivers so that the group head does not immediately mark it for pruning but when the sender's data rate drops so low that data transmission is beyond the operating characteristics of the sender or is too slow to be practical, then the sender stops reducing its data rate and lets the group head mark the receiver for pruning.

In accordance with an embodiment consistent with the present invention, a method and apparatus for distributing multicast data, performed by a data processor, includes the steps of forming a multicast repair tree including a sender, a plurality of heads, and a plurality of receivers. At least one head is associated with the sender and at least one receiver is associated with the head. A sender sends a plurality of multicast messages at a data rate to the plurality of heads and the plurality of receivers. The sender receives a status associated with a receiver of the head from one of the plurality of heads. The status may be a congestion status. The sender slows the data rate in accordance with the status. An embodiment consistent with the present invention may be implemented as a computer program product or as a computer data signal embodied in a carrier wave.

Advantages of the invention will be set forth, in part, in the description that follows and in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 4-A and FIG. 4-B is a flow chart showing steps performed by a data processing system programmed to perform pruning operation by a sender in accordance with an embodiment consistent with the present invention.

DETAILED DESCRIPTION OF PREFERRED EMBODIMENTS

Reference will now be made in detail to embodiments consistent with the present invention, examples of which are illustrated in the accompanying drawings. Wherever possible, the same reference numbers will be used throughout the drawings to refer to the same or like parts.

Figure 1:
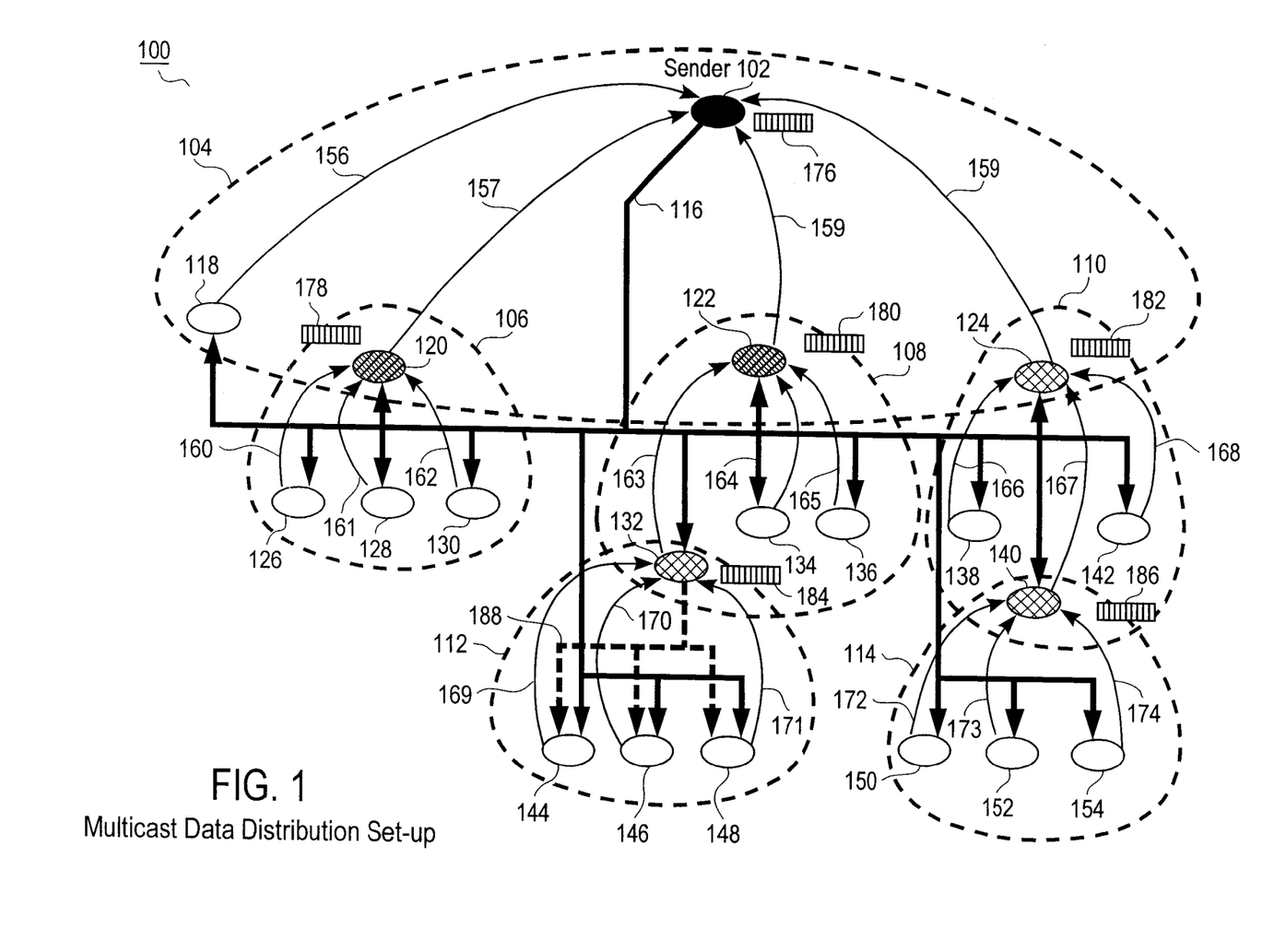
FIG. 1 is a diagram of a multicast data distribution set-up in accordance with an embodiment consistent with the present invention.

FIG. 1 shows a multicast data distribution set-up 100 in accordance with an embodiment consistent with the present invention. The set-up is in the form of a tree and includes a sender node 102 and a plurality of receivers 118–154. Each of receivers 118–154 are part of the multicast group of sender 102, as shown by multicast message path shown by arrow 116 which connects sender 102 to each of receivers 118–154 in a multicast group. The multicast group members are associated with a multicast address. In order to send a message to all of the receivers in the multicast group, sender 102 sends a message to the multicast group address. Receivers 118–154 are organized in five subgroups 106–114. Each subgroup includes a head and at least one receiver.

The following paragraphs describe the groups making up a multicast data distribution set-up 100 (also known as a multicast repair tree) shown in FIG. 1. Note that all of the group members and most of the heads (except for the sender) are receiver nodes. In general, the heads are sender node 102 and receiver nodes 120, 122, 124, 132, and 140. The nodes which are only receivers (i.e., not heads) are receivers 118, 126, 128, 130, 134, 136, 138, 142, 144, 146, 148, 150, 152, and 154.

Group 104 contains a head 102 (which is also the sender) and group members 118, 120, 122, and 124. Group 104 members 120, 122, and 124 are designated as heads for the next level of groups 106, 108, and 110, but group 104 member 118 is a not repair head and therefore does not have a group associated with it.

Group 106 includes a head 120 and group members 126, 128, and 130. Heads may also be group members. For example, head 120 is the head of group 106 but also is a member of group 104.

Group 108 includes a head 122 and group members 132, 134, and 136. Group member 132 is also the head of group 112. Group 112 includes a head 132 and receiver members 144, 146, and 148.

Group 110 includes a head 124 and members 138, 140, and 142. Head 124 is also a member of group 104, and group member 140 is the head of group 114. Group 114 includes ahead 140 and members 150, 152, and 154.

After the multicast data distribution tree is set up, a sender node 102 begins to send multicast messages to the multicast group address. Two types of messages are sent in this fashion: control messages and data messages. Sender 102 sends both types of messages along multicast message path 116 to receivers 118–154. Sender 102 stores the message in cache 176 so that it may respond to repair requests of the multicast message from each of its group members, i.e., receivers 118, 120, 122, and 124. The multicast message remains in cache 176 until each group member 118, 120, 122, and 124 has sent an acknowledgment of receipt to sender 102.

Group members 118, 120, 122, and 124 each send an acknowledgment of receipt to sender 102 such as shown by arrows 156, 157, 158, and 159 respectively. The acknowledgment of receipt may be a unicast message or any other appropriate message. Note that sender 102 receives acknowledgment of receipt messages only from members 118, 120, 122, and 124 of its group, not from all nodes in multicast data distribution tree 100. Other messages which group members 118, 120, 122, and 124 may send to sender 102 include repair requests.

Similarly, each of the other heads in a multicast data distribution set-up 100 store the multicast message in cache until receiving an acknowledgment of receipt from all of their respective group members. Heads 120, 122, 124, 132, and 140 store the message in a cache 178, 180, 182, 184, and 186, respectively associated with each head. While waiting for an acknowledgment of receipt from all of its group members, a head will respond to repair requests from its group members by retransmitting the message stored in cache.

After the multicast message is sent, the head of each repair group waits for acknowledgments of receipt from its group members. Head 120 of group 106 waits for acknowledgments of receipt from its members shown by arrow 160 from receiver 126, arrow 161 from receiver 128, and arrow 162 from receiver 130. Head 122 of group 108 waits for acknowledgment of receipt shown by arrows 163, 164, and 165 from receivers 132, 134, and 136, respectively. Head 124 of group 110 waits for acknowledgments of receipt shown by arrows 166, 167, and 168 from receivers 138, 140, and 142, respectively. Head 140 of group 114 waits for acknowledgments of receipt shown by arrows 172, 173, and 174 from receivers 150, 152, and 154, respectively. Head 132 of group 112 waits for acknowledgments of receipt shown by arrows 169, 170, and 171 from receivers 144, 146, and 148, respectively.

Multicast repair is shown in group 112, in which head 132 responds to a request for repair from at least one of its group members 144, 146, or 148. Repair requests are sent to the group head in a similar manner as an acknowledgment receipt. For example, head 132 may receive a repair request message from receiver 144 as shown by arrow 169. When a group member sends a repair request, head 132 resends the multicast message which it has stored in cache 184 to each of its group members along a multicast repair path shown by the dotted line 188.

Figure 2:
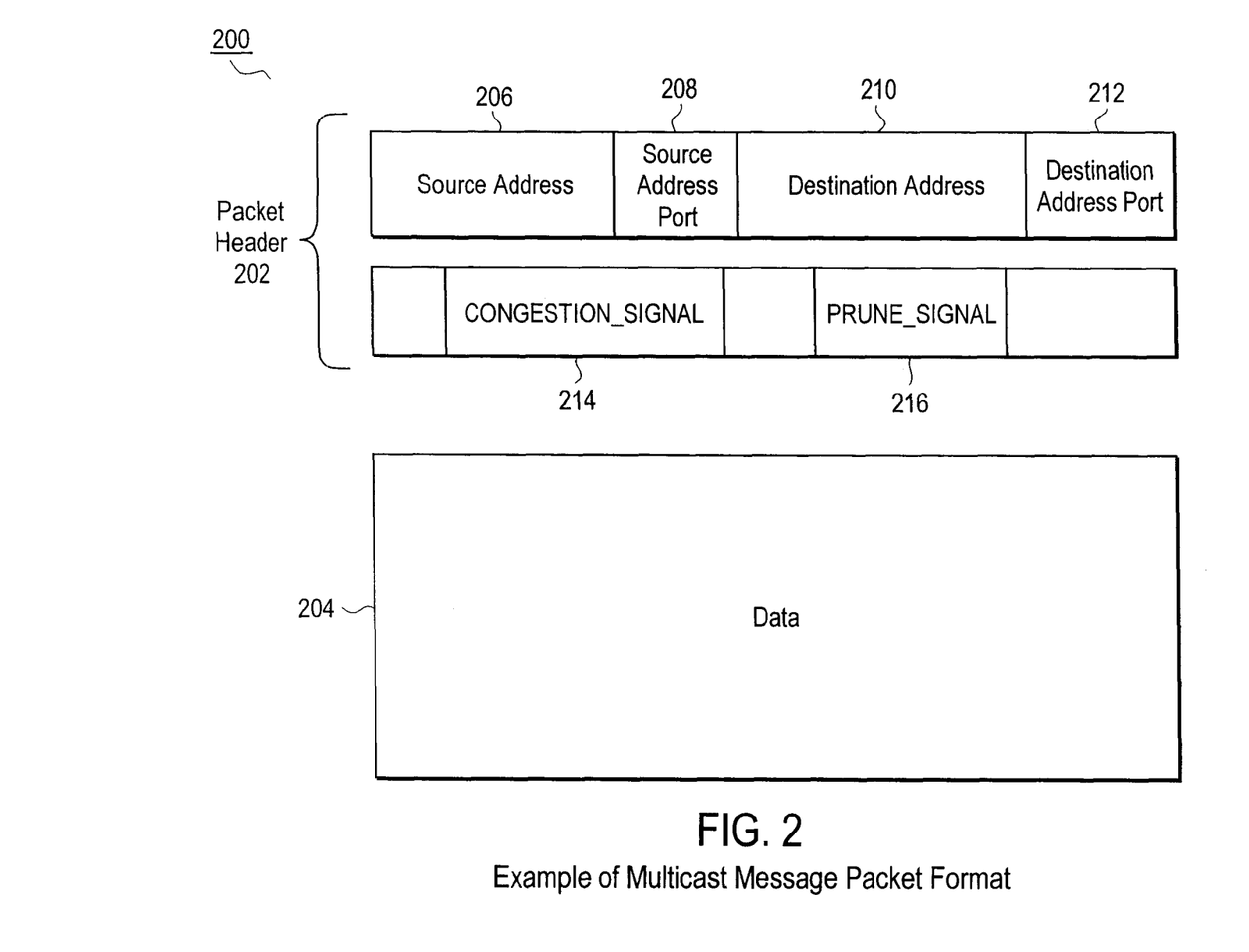
FIG. 2 is an exemplary format of a multicast message packet in accordance with an embodiment consistent with the present invention.

FIG. 2 shows an example of a multicast message packet format 200 which is used in an embodiment consistent with the present invention. Packet format 200 contains a packet header 202 and data 204. Packet header 202 is used for processing the multicast message packet and includes fields indicating at least the following: a source address 206, a source address port 208, a destination address 210, and a destination port 212. These fields are included in a typical multicast message packet format. Multicast message packets are described in more detail in D. Comer, *Internetworking with TCP/IP*, Prentice Hall, 1991, Chapter 17, which is herein incorporated by reference to the extent that it is not inconsistent with the present invention.

There are two kinds of multicast messages: control messages and data messages. Control messages are used for tasks such as setting up the multicast data distribution set-up (also known as a multicast repair tree) and for performing sender-initiated pruning. Control messages typically contain only protocol-related information and are used for communication between nodes in the multicast data distribution set-up, for example when a receiver sends an acknowledgment of receipt to a head. Data messages contain data which a sender distributes to receivers in a multicast group.

Multicast message packet format 200 is an example of a control message used in an embodiment consistent with the present invention and includes the following fields: CONGESTION_SIGNAL 214 and PRUNE_SIGNAL 216. Fields 214 and 216 represent signals used by a sender 102 in a centralized mechanism to control the pruning process. Both CONGESTION_SIGNAL 214 and PRUNE_SIGNAL 216 are set to FALSE when no congestion is being reported by the receivers. CONGESTION_SIGNAL 214 in packet 200 is set to TRUE when a CongestionFlag in sender 102 is set to TRUE, indicating that congestion is being reported. PRUNE_SIGNAL 216 in packet 200 is set to TRUE when a PruneFlag in sender 102 is set to TRUE, indicating that sender 102 recommends that each head identify pruning candidates in the head's group. Each head keeps a list of the receivers in its group and monitors the status of each receiver in response to signals from the sender, as will be described more fully in the discussion of FIG. 5.

Receivers become candidates for pruning if they are slow, request excessive repairs, or have become unresponsive. Slow receivers are unable to respond fast enough to keep up with the sender's data rate. When a receiver does not get the sender's multicast message, it makes a repair request to the head, telling the head to resend the multicast message to the receiver. When a receiver makes numerous repair requests, it indicates that the receiver may not be able to keep up with the sender's data rate. A receiver may become unresponsive if a network partition occurs. For example, given two separate networks connected by a link where a head is in one of the networks and a receiver is in the other, if the link between two networks is severed, the receiver may still be working but it will not be able to communicate with the head due to the severed link. The receiver in this case is treated as a pruning candidate since it is no longer responsive to the head.

Figure 3:
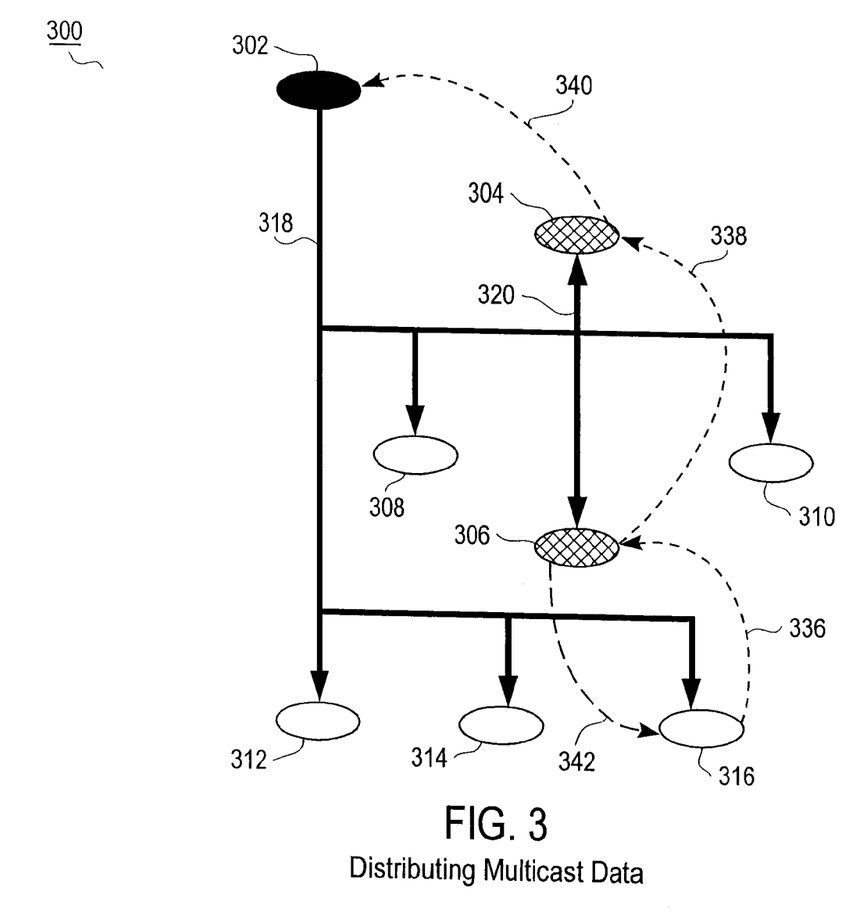
FIG. 3 is a diagram of a multicast data distribution set-up to prune nodes in accordance with an embodiment consistent with the present invention.

FIG. 3 shows a small multicast data distribution set-up 300 of an embodiment consistent with the present invention to prune nodes. Multicast data distribution set-up 300 includes a sender 302 and seven receivers 304, 306, 308, 310, 312, 314, and 316. Receivers 304 and 306 also perform as heads. Sender 302 receives a data packet transmit event and in response, sends a data packet to the receivers, as shown by arrow 318. Upon receiving the data packet, heads 304 and 306 receive a data packet reception event, shown by arrows 320 and 322 respectively. Head 304 then begins to monitor receivers 308, 306, and 310 in its group. Head 306 is monitored as a member of the group of head 304. Head 306 in turn monitors the members of its group which includes receivers 312, 314, and 316.

For example, in an embodiment consistent with the present invention, receiver 316 is a receiver which has been marked for pruning. Head 306 receives a congestion report event, shown by arrow 336. Head 306 forwards the congestion information to head 304, as shown by arrow 338, and head 304 forwards the congestion information to sender 302, as shown by arrow 340. In this manner, head 306 propagates the congestion information from pruning candidate 316 upward to sender 302. Sender 302, in response to receiving the congestion report event, reduces its data rate for the entire multicast in order to accommodate pruning candidate 316. After sending a number of packets and incrementally reducing the data rate with each pass, sender 302 will eventually reach a minimum data rate if it continues to receive congestion reports. Upon reaching the minimum data rate, sender 302 sends a prune recommendation signal (PRUNE_SIGNAL is TRUE) to the heads in the next data packet transmitted. When head 306 receives the packet containing the prune recommendation, it isolates pruning candidate 316 and sends a Member_Disowned signal, as shown by arrow 342. This removes the receiver from the group. The result is that head 306 will ignore any future repair requests, which it receives from pruned receiver 316.

Figure 4:
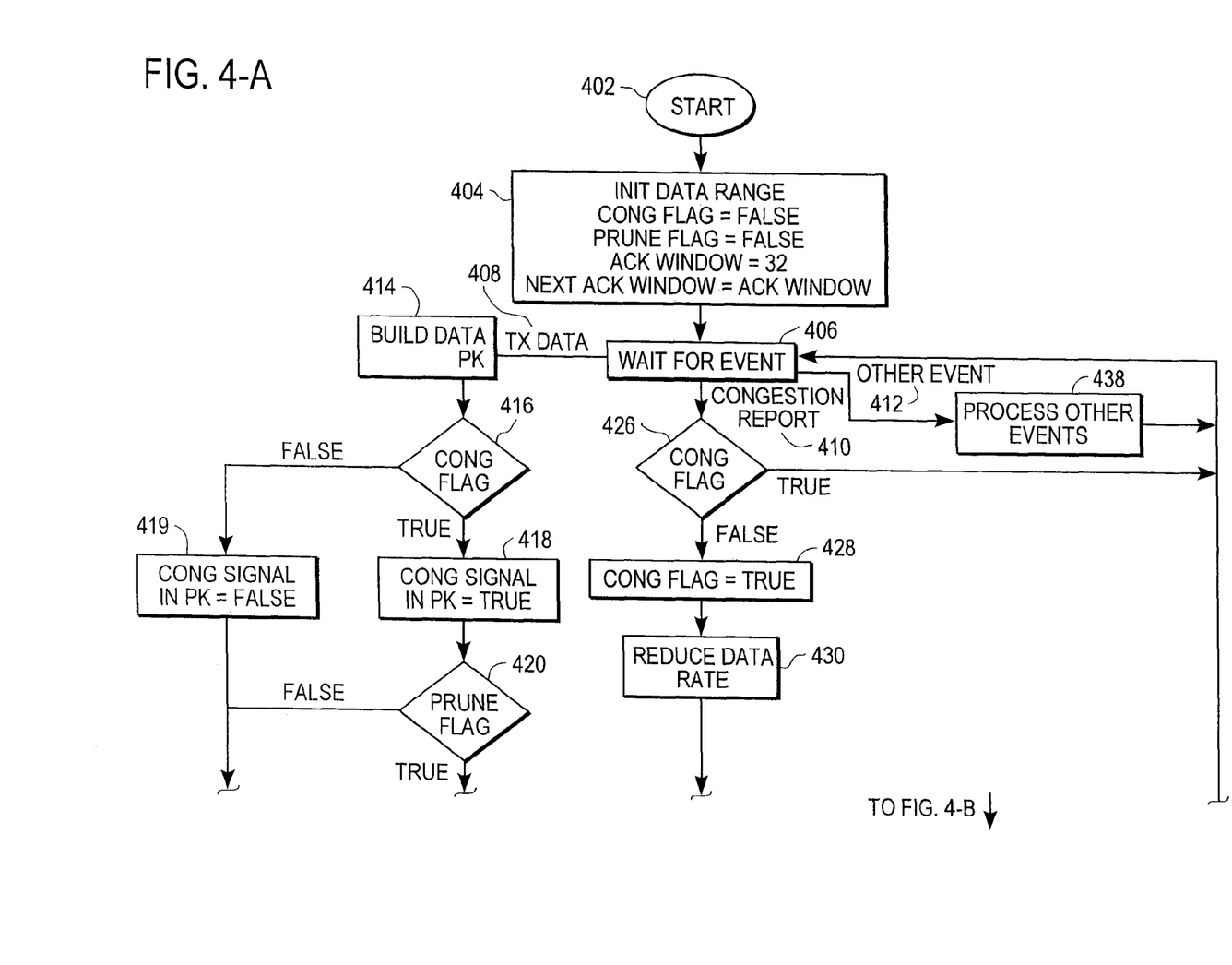

FIG. 4-A and FIG. 4-B is a flowchart 400 showing steps performed by a data processing system programmed to implement a pruning operation consistent with the present invention at a the sender 102, beginning at step 402. Sender 102 performs an initialization step 404 in which it initializes its data rate, sets its CongestionFlag 930 to FALSE (See FIG. 9.), sets its PruneFlag 940 to FALSE (See FIG. 9.), sets a value ACK WINDOW to be 32, and then sets a value NEXT ACK WINDOW to be equal to ACK WINDOW.

ACK WINDOW is a parameter that defines an interval called an ACK window in which a group of packets are sent. An ACK window is used for keeping track of packets which are sent, making adjustments in the data rate, and for clearing CongestionFlag 930 and PruneFlag 940 when appropriate. A packet sequence number is used to keep track of each packet in the ACK WINDOW. The packet sequence number is useful for determining how many of the packets sent in the ACK WINDOW were received or lost. For example, if the ACK WINDOW boundary is reached and none of the packets have been acknowledged as received, it means that all of the packets sent in the ACK window were lost or simply not acknowledged yet.

After initialization, sender 102 waits for an event in step 406, such as a data packet transmit event 408, a congestion report event 410, or any other event 412 which is appropriate to the application.

In response to receiving data packet transmit event 408, indicating that a new packet is to be sent, a sender 102 builds a data packet in step 414 and then checks the value of CongestionFlag 930 in step 416. If CongestionFlag 930 is TRUE, the sender 102 sets a CONGESTION_SIGNAL field 214 in the data packet to TRUE, step 418, and then checks PruneFlag 940 in step 420. If PruneFlag 940 is TRUE, sender 102 sets PRUNE_SIGNAL 216 in the data packet to TRUE and continues to step 444. Setting PRUNE_SIGNAL to TRUE indicates to the heads that sender 102 recommends monitoring their lists of receivers for pruning candidates. If PruneFlag 940 is FALSE, sender 102 sets PRUNE_SIGNAL 216 in the data packet to FALSE and continues to step 444.

If CongestionFlag is FALSE, sender 102 sets CONGESTION_SIGNAL field 214 in the data packet to FALSE, sets PRUNE_SIGNAL field 216 in the data packet to FALSE, and then continues to step 444. Setting CONGESTION_SIGNAL 214 and PRUNE_SIGNAL 216 to FALSE indicates no congestion has been reported from the receivers.

After setting CONGESTION_SIGNAL 214 and PRUNE_SIGNAL 216 in the data packet, sender 102 increments a packet sequence number in step 444, to reflect that sender 102 has processed another packet in the ACK window. Sender 102 compares value of the packet sequence number in step 446 to the value of NEXT ACK WINDOW. If the packet sequence number is less than or equal to the value of NEXT ACK WINDOW, then sender 102 sends the packet in step 424, delays in order to achieve the current data rate in step 448, and then returns to step 406 to wait for another event.

If the packet sequence number is greater than the value of NEXT ACK WINDOW, indicating that the packet sequence number is outside of the ACK window boundary, sender 102 in step 450 clears CongestionFlag 930, clears PruneFlag 940, and sets the next ACK window boundary by setting the value of NEXT ACK WINDOW to be equal to NEXT ACK WINDOW plus the value of ACK WINDOW. In the example given in FIG. 4, in which ACK WINDOW is set to be equal to 32, NEXT ACK WINDOW would be set to NEXT ACK WINDOW plus 32. In step 452, sender 102 increases the data rate incrementally. The value of the increment may be, for example, 10% of the current data rate of sender 102 but any appropriate increment may be used. Sender 102 then checks the data rate in step 454, and if the data rate is less than or equal to the maximum data rate, sender 102 sends the data packet in step 424. If sender 102 determines in step 454 that the data rate is greater than the maximum data rate, then sender 102 sets the data rate to be equal to the maximum data rate in step 456, continues to step 424 and sends the packet.

Sender 102 may receive a congestion report event 410 from a head indicating that at least one of the receivers has reported congestion. In step 426, sender 102 checks the value of CongestionFlag 930. If the report is redundant, i.e., CongestionFlag is set to TRUE, then sender 102 ignores that report, goes back to step 406 and waits for another event. A congestion report is redundant if it has been received from the same ACK window. If in step 426 the congestion report is not redundant, i.e., CongestionFlag is set to FALSE, then in step 428, CongestionFlag 930 is set to be TRUE indicating that there is congestion in the multicast tree.

In response to the congestion report, sender 102 attempts to reduce the amount of congestion in the tree by reducing the current data transmission rate at step 430. The data rate is typically reduced by a percentage, for example 10%, of the current data rate, but may be reduced by any amount appropriate to the application being performed. After reducing the data rate, sender 102, in step 432 checks whether the new data rate is less than a predetermined minimum rate. This minimum rate typically depends on the operating characteristics of the sender, the receivers, and the application but may be set to any appropriate data rate. The minimum data rate is specified by the application and may be, for example, 56 kilobits per second in an application running at 10 megabits per second. An example of a slow receiver is a dial-in modem running at 2400 baud. It is impractical for a sender transmitting at 10 megabits per second to a large number of receivers to slow its data rate to 2400 baud to accommodate one dial-in modem. If the new data rate is greater than or equal to the minimum data rate in step 432, then processing continues at step 406 where the sender waits for another event to occur.

If the new data rate is less than the minimum rate in step 432, then sender 102 sets the current data rate to be equal to the minimum rate at step 434 and sets PruneFlag 940 to a value of TRUE at step 436. After setting PruneFlag 940 to TRUE in step 436, sender 102 continues to step 406 and waits for another event.

All other events 412 are processed in step 438, and include any other events appropriate to the operation of a multicast data distribution set up. After such an event is complete, sender 102 goes back to step 406 and waits for another event.

Figure 5:
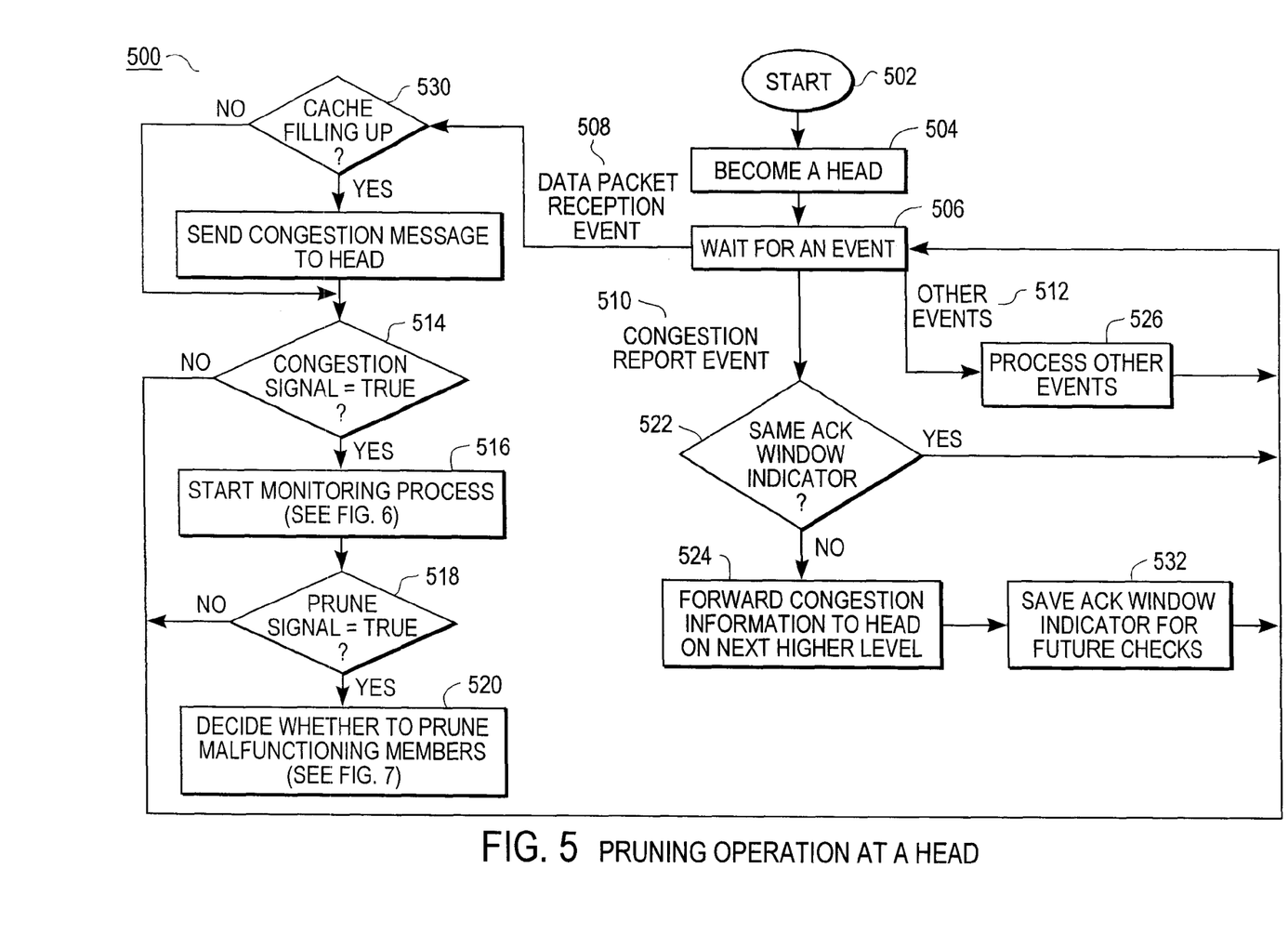
FIG. 5 is a flow chart showing steps performed by a data processing system programmed to perform pruning operation by a head in accordance with an embodiment consistent with the present invention.

FIG. 5 is a flowchart 500 showing steps performed by a data processing system programmed to be a head in accordance with the an embodiment consistent with the present invention which starts at step 502 and continues at step 504 where a receiver becomes a head. The head then waits for an event at step 506. Processor events that can occur include: a data packet reception event 508, a congestion report event 510, and other events 512, which include other events appropriate to the operation of a multicast data distribution set up.

If the head receives a data packet reception event 508, the head checks whether its cache is filling up in step 530. If the head's cache is filling up quickly or is just about full, then the head sends a congestion message to its reporting head in step 532. If the head's cache is not filling up, then the head checks whether the CONGESTION_SIGNAL field 214 in the data packet is set to a value of TRUE. If the CONGESTION_SIGNAL field 214 is set to FALSE at step 514, the head returns to step 506 and waits for another event. If CONGESTION_SIGNAL field 214 is set to TRUE, then at step 516 the head starts monitoring and isolating pruning candidates in its group. This process is discussed in more detail below in the discussion of FIG. 6. After monitoring and isolating pruning candidates, the head checks in step 518 if the PRUNE_SIGNAL field 216 in the packet has been set to TRUE. If PRUNE_SIGNAL field 216 is FALSE, then the sender returns to step 506 and waits for another event. However, if PRUNE_SIGNAL is set to TRUE, then in step 520 the head decides whether to prune any of the pruning candidates. After pruning the pruning candidates, the head goes back to step 506 and waits for another event.

The head, while waiting at step 506 for an event, may receive a congestion report event 510 which indicates that one of the receivers in the head's group has reported some congestion. The head then checks in step 522 if the congestion report is redundant by checking if the congestion report message has come from the same ACK window. A congestion report is redundant at a head if it has been received from the same ACK window. An ACK window indicator is used to indicate which ACK window the congestion report was sent from. If the congestion report is redundant, the head ignores the report and returns to step 506, where it waits for another event. However, if the congestion report is not redundant, then the head at step 524 forwards the congestion information to the head at the next higher level in the multicast data distribution set-up The congestion information is propagated upward from this head until it reaches the sender. For example, head 140 would forward the congestion report to head 124 which would then forward the congestion report to sender 102. After propagating the congestion information upward to the sender, the head saves in step 528 the current ACK window indicator for future redundant congestion report checks and then returns to step 506 where it waits for another event.

Figure 6:
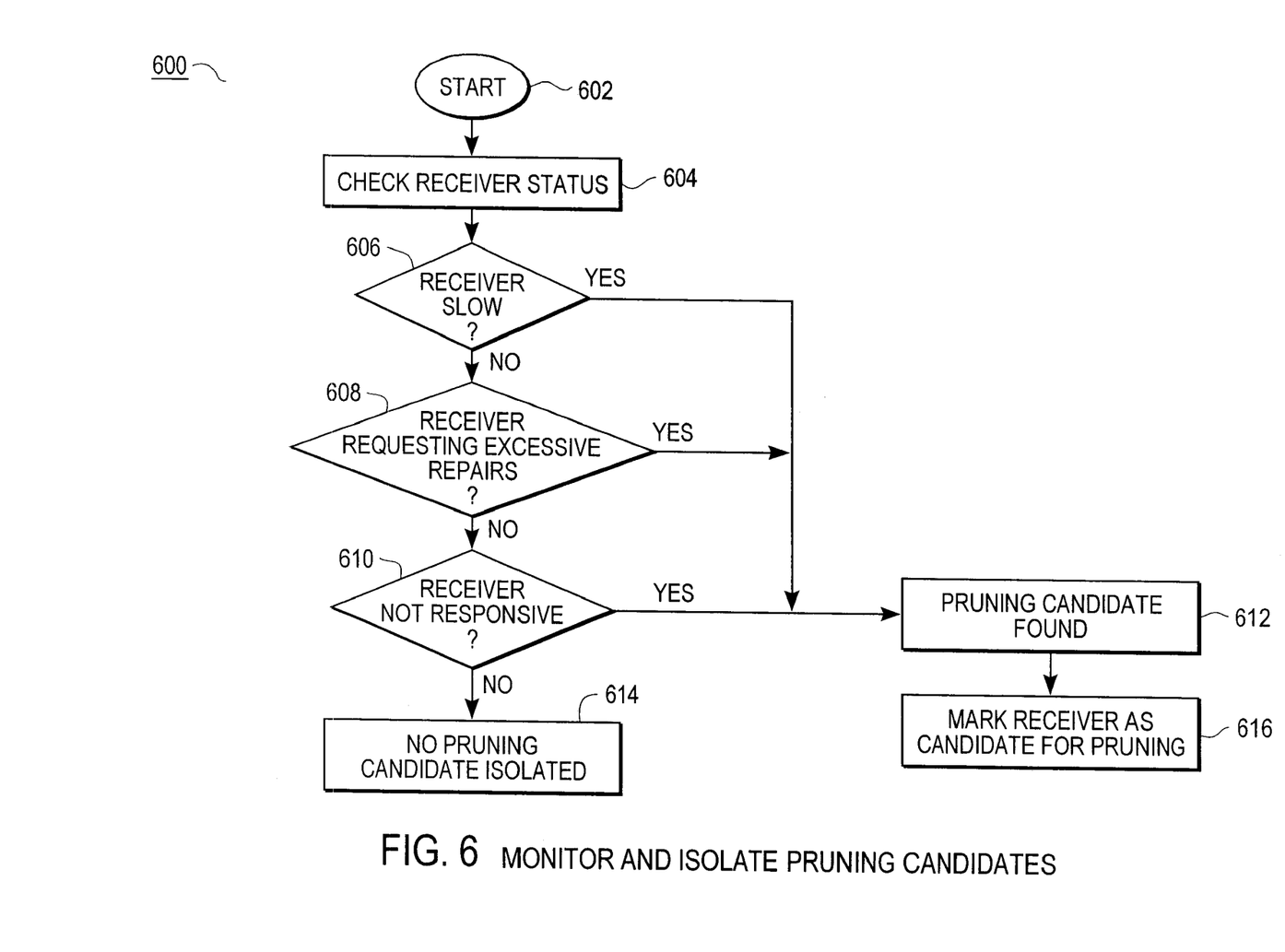
FIG. 6 is a flow chart showing steps performed by a data processing system programmed to monitor and isolate pruning candidates by a head in accordance with an embodiment consistent with the present invention.

FIG. 6 is a flowchart 600 showing steps performed by a data processing system programmed to monitor and to isolate pruning candidates in accordance with an embodiment consistent with the present invention. Flowchart 600, beginning at step 602, corresponds to the monitoring process of step 516 in FIG. 5 and is performed if CONGESTION_SIGNAL field 214 in the packet is set to "ON." At step 604, the head checks a receiver status. The purpose of checking the receiver status is to find out which of the receivers in the head's group are candidates for pruning. After checking the receiver status, the head determines whether the receiver is a candidate for pruning by checking whether the receiver is slow in step 606, whether the receiver is requesting excessive multicast repairs from the head in step 608, or whether the receiver is just not responsive in step 610. If the answer to any of the checks in steps 606, 608 and 610 is yes, then the head indicates that a pruning candidate was found in step 612 and marks that receiver as a candidate for pruning in step 616. If the answer to all of steps 606, 608 and 610 is no, then the head indicates that no pruning candidates were isolated in step 614.

Figure 7:
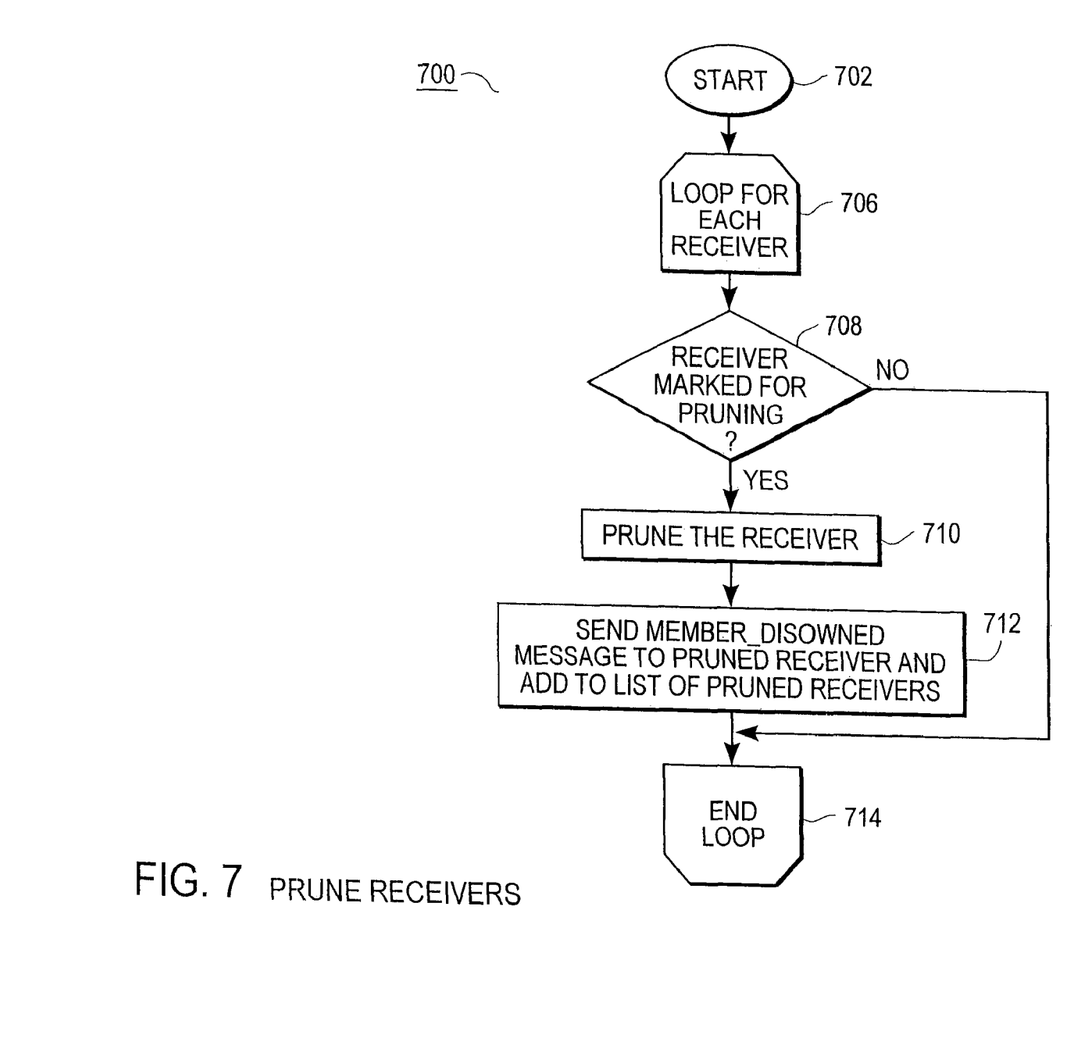
FIG. 7 is a flow chart showing steps performed by a data processing system programmed to prune receivers by a head in accordance with an embodiment consistent with the present invention.

FIG. 7 is a flowchart 700 showing steps performed by a data processing system programmed to be a head and to prune receivers in accordance with an embodiment consistent with the present invention. Flowchart 700, beginning at step 702, corresponds to the process of deciding whether to prune the pruning candidates shown in step 520 in FIG. 5 and is performed if PRUNE_SIGNAL field 216 in the packet is set to TRUE. Flowchart 700 loops for each receiver beginning at step 706 and ending at step 714. In step 708, the head checks whether a receiver is marked for pruning. If the receiver is not marked for pruning, head continues on to step 714 which loops back to step 706 and starts processing for the next receiver. If the receiver is marked for pruning, the receiver is pruned in step 710.

In step 712, the head sends a Member_Disowned message to the pruned receiver indicating that the head will no longer honor multicast repair requests from the pruned receiver. The head then indicates that it should not perform repair on the pruned node, i.e., the head puts the pruned node on its list of pruned receivers 819. (See FIG. 8.) The receiver sets its receiver status to indicate that it has been pruned. If there are no more receivers to process, then the process of pruning is complete. However, if there are more receivers to process, the head returns to step 706.

Figure 8:
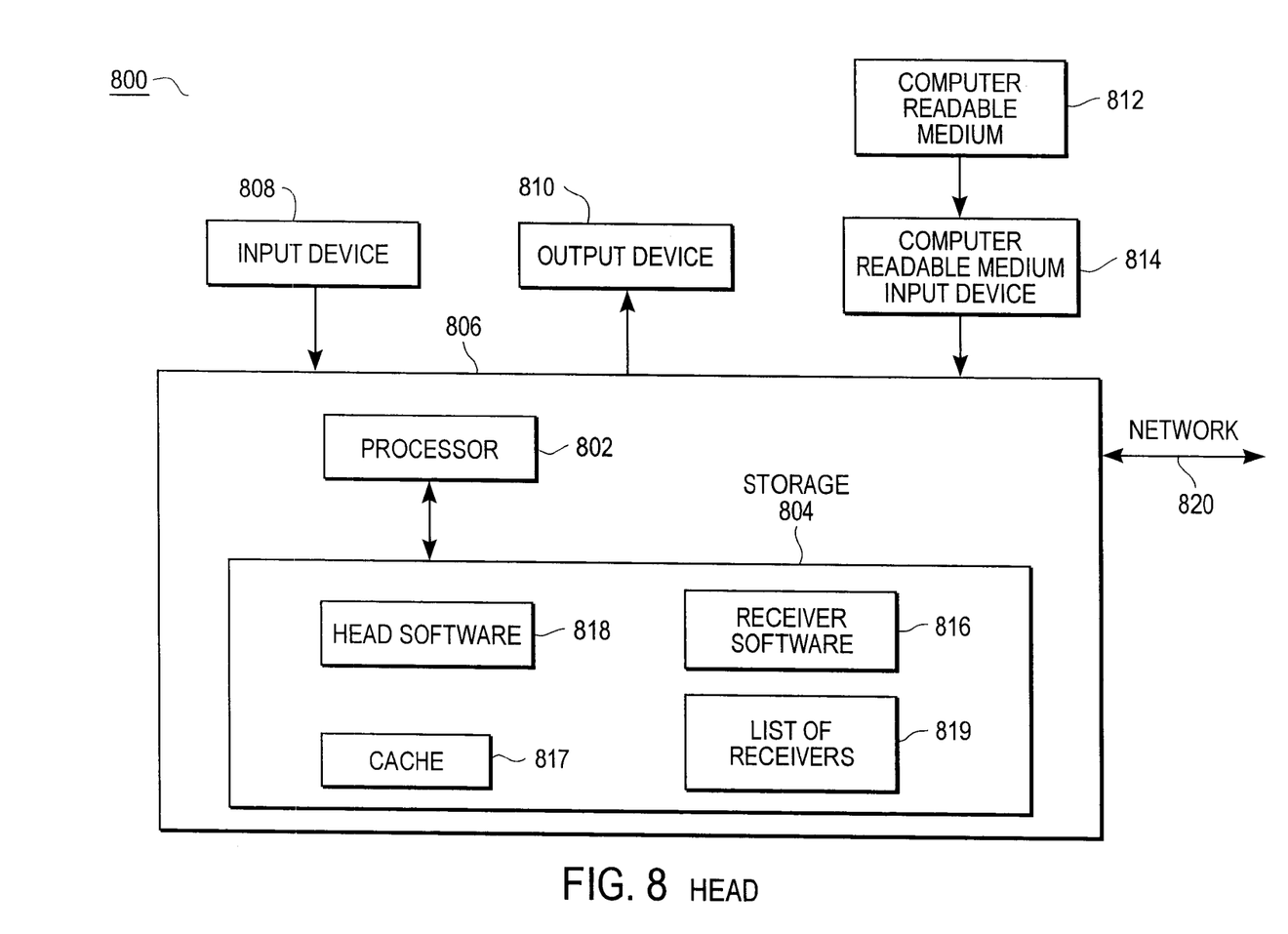
FIG. 8 is a diagram showing a data processing system programmed to be a head in accordance with an embodiment consistent with the present invention.

FIG. 8 shows a computer system 800 which includes a processor 802 and storage 804, which includes head software 818 programmed to perform the functions of a head, receiver software 816 programmed to perform the functions of a receiver, a cache 817, and a list receivers 819. Some of the receivers in list 819 may be marked as candidates for pruning. Computer system 800 also includes a network connection 820, an input device 808, output device 810, computer readable medium 812, and computer readable input device 814. Each of the nodes in network 100 may be a computer system such as computer system 800, connected other nodes in the network via network connection 820. Since the same node can be a receiver and also a head, head software 818 and receiver software 816 are both shown as being part of system 800 inside storage 804.

A person of ordinary skill in the art will understand that data processing system 800 may also contain additional information, such as input/output lines; input devices, such as a keyboard, a mouse, and a voice input device; and display devices, such as a display terminal. Input device 808 may be a floppy disk drive, CD ROM reader, or DVD reader, that reads computer instructions stored on a computer readable medium, such as a floppy disk, a CD ROM, or a DVD drive. Data processing system 800 also may include application programs, operating systems, data, etc., which are not shown in the figure for the sake of clarity. It also will be understood that data processing system 800 may also include numerous elements not shown, such as disk drives, keyboards, display devices, network connections, additional memory, additional CPUs, LANs, input/output lines, etc.

It will be understood that the steps of methods and flow charts discussed preferably are performed by an appropriate processor 802 executing instructions stored in storage 804. It will also be understood that the invention is not limited to any particular implementation or programming technique and that the invention may be implemented using any appropriate techniques for implementing the functionality described herein. The invention is not limited to any particular programming language or operating system.

The instructions in storage 804 may be read from computer-readable medium 812. Execution of sequences of instructions contained in storage 804 causes processor 802 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to a processor for execution. Such a medium may take many forms, including but not limited to, non-volatile media, volatile media, and transmission media. Non-volatile media includes, for example, optical or magnetic disks, such as a storage device. Volatile media includes dynamic memory. Transmission media include coaxial cables, copper wire and fiber optics, including the wires that comprise a bus within a computer. Transmission media can also take the form of acoustic or light waves, such as those generated during radio-wave and infra-red data communications.

Common forms of computer-readable media include, for example a floppy disk, a flexible disk, a hard disk, magnetic tape, or any other magnetic medium, a CD-ROM, any other optical medium, punch cards, paper tapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor. The instructions can also be transmitted via a carrier wave in a network, such as a LAN, a WAN, or the Internet.

Figure 9:
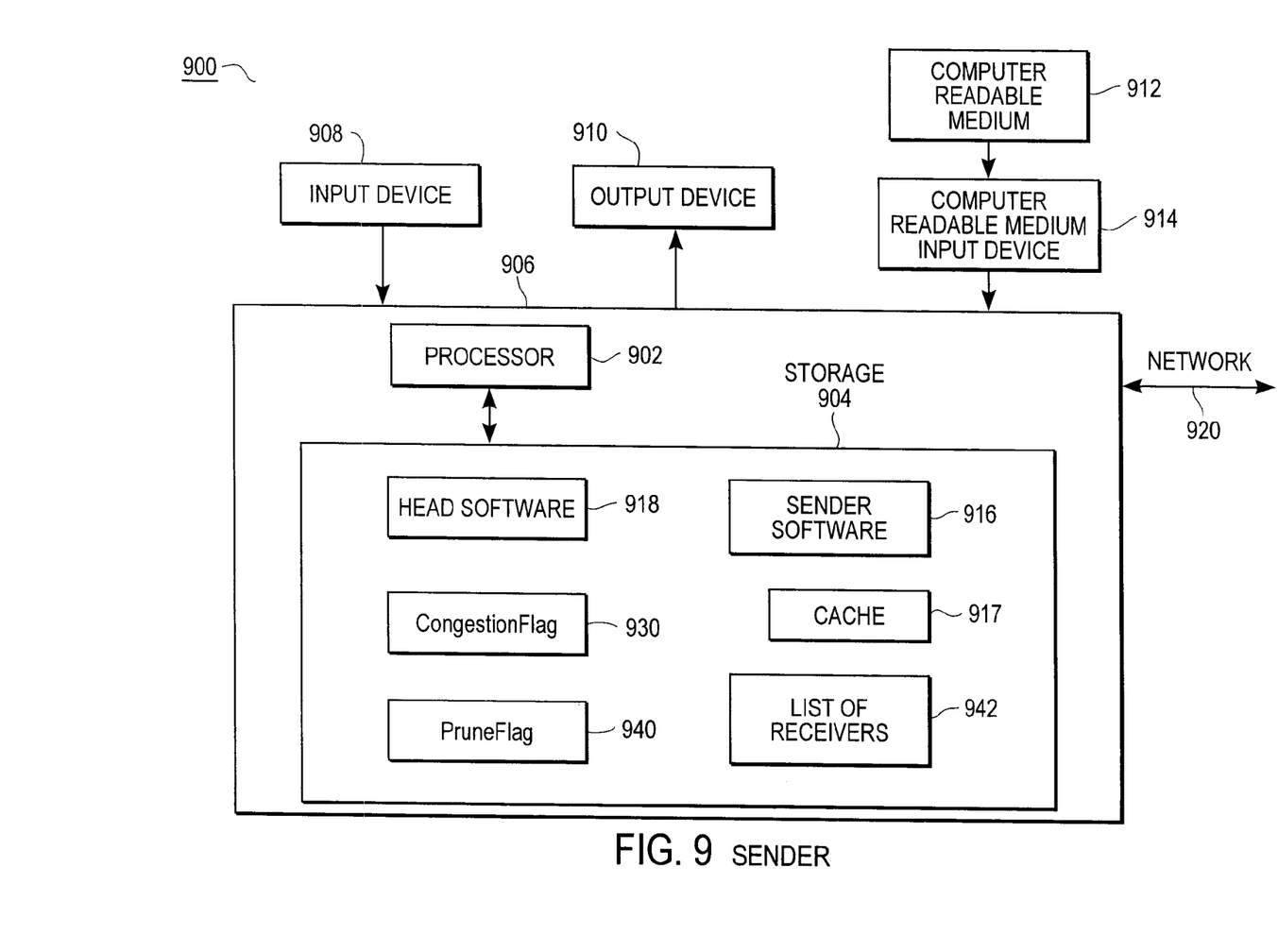
FIG. 9 is a diagram showing a data processing system programmed to be a sender in accordance with an embodiment consistent with the present invention.

FIG. 9 shows a computer system 900 which includes a processor 902 and storage 904, which includes sender software 916 programmed to perform the functions of a sender, a cache 917, a CongestionFlag 930, a PruneFlag 940, and a list of receivers 942. Some of the receivers in list 942 may be marked as candidates for pruning. Computer system 900 also includes a network connection 920, an input device 908, output device 910, computer readable medium 912, and computer readable input device 914. Each of the nodes in network 100 may be a computer system such as computer system 900, connected other nodes in the network via network connection 920.

A person of ordinary skill in the art will understand that data processing system 900 may also contain additional information such as that described above in the discussion of data processing system 800.

Other embodiments consistent with the present invention will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method of distributing multicast data, comprising:
   receiving, by a head from a sender, a multicast message having a prune indicator set, the prune indicator set based on a congestion feedback;
   beginning, by the head, in response to receiving the multicast message, to monitor a plurality of receivers associated with the head to determine if any of the receivers are candidates for pruning; and
   pruning, by the head, if the receiver is a pruning candidate.

2. The method of claim 1, wherein the beginning to monitor includes determining whether any of the plurality of receivers is slow.

3. The method of claim 1, wherein the beginning to monitor includes determining whether any of the plurality of receivers has requested excessive repairs from the head.

4. The method of claim 1, wherein the beginning to monitor includes determining whether any of the plurality of receivers is not responsive.

5. A method of distributing multicast data comprising:
   receiving, by a head from a sender, a multicast message having a prune indicator set, the prune indicator set based on a congestion feedback; and
   pruning, by the head, in response to the multicast message, the receivers.

6. The method of claim 5, wherein the pruning the receiver includes sending a disowned message to the pruned receiver.

7. The method of claim 5, wherein the pruning the receiver includes indicating that the head should not respond to a repair request from the receiver in the future.

8. A computer-readable medium for storing instructions for a computer to prune receivers, the instructions comprising:
   receiving, by a head from a sender, a multicast message having a prune indicator set, the prune indicator set based on a congestion feedback;
   beginning, by the head, in response to receiving the multicast message, to monitor a plurality of receivers associated with the head to determine if any of the receivers are candidates for pruning; and
   pruning, by the head, if the receiver is a pruning candidate.

9. The computer-readable medium of claim 8, wherein the beginning to monitor includes determining whether any of the plurality of receivers is slow.

10. The computer-readable medium of claim 8, wherein the beginning to monitor includes determining whether any of the plurality of receivers has requested excessive repairs from the head.

11. The computer-readable medium of claim 8, wherein the beginning to monitor includes determining whether any of the plurality of receivers is not responsive.

12. A head in a multicast system, comprising:
   means for receiving, from a sender, a multicast message having a prune indicator set, the prune indicator set based on a congestion feedback;
   means for beginning, in response to receiving the multicast message, to monitor a plurality of receivers associated with the head to determine if any of the receivers are candidates for pruning; and
   means for pruning if the receiver is a pruning candidate.

13. A computer-readable medium for storing instructions for a computer to prune receivers, the instructions comprising:
   receiving, by a head from a sender, a multicast message having a prune indicator set, the prune indicator set based on a congestion feedback; and
   pruning, by the head, in response to the multicast message, the receivers.

14. The computer-readable medium of claim 13, wherein the pruning the receiver includes sending a disowned message to the pruned receiver.

15. The computer-readable medium of claim 13, wherein the pruning the receiver includes indicating that the head should not respond to a repair request from the receiver in the future.

16. A head in a multicast system, comprising:
   means for receiving, from a sender, a multicast message having a prune indicator set, the prune indicator set based on a congestion feedback; and
   means for pruning in response to the multicast message, the receivers.

* * * * *